(12) United States Patent
Lutjen et al.

(10) Patent No.: US 8,998,572 B2
(45) Date of Patent: Apr. 7, 2015

(54) BLADE OUTER AIR SEAL FOR A GAS TURBINE ENGINE

(75) Inventors: Paul M. Lutjen, Kennebunkport, ME (US); Thurman Carlo Dabbs, Dover, NH (US)

(73) Assignee: United Technologies Corporation, Hartford, CT (US)

( * ) Notice: Subject to any disclaimer, the term of this patent is extended or adjusted under 35 U.S.C. 154(b) by 401 days.

(21) Appl. No.: 13/487,347

(22) Filed: Jun. 4, 2012

(65) Prior Publication Data
US 2013/0323032 A1    Dec. 5, 2013

(51) Int. Cl.
F01D 11/12    (2006.01)
F04D 29/16    (2006.01)

(52) U.S. Cl.
CPC .................................. F04D 29/164 (2013.01)

(58) Field of Classification Search
CPC ...................................................... F01D 11/12
USPC ........................................... 415/173.1, 174.1
See application file for complete search history.

(56) References Cited

U.S. PATENT DOCUMENTS

| | | | |
|---|---|---|---|
| 4,013,376 A * | 3/1977 | Bisson et al. | 415/117 |
| 5,048,288 A * | 9/1991 | Bessette et al. | 60/226.1 |
| 5,391,052 A * | 2/1995 | Correia et al. | 415/115 |
| 5,609,469 A * | 3/1997 | Worley et al. | 415/173.1 |
| 6,393,331 B1 | 5/2002 | Chetta et al. | |
| 6,997,673 B2 | 2/2006 | Morris et al. | |
| 7,246,993 B2 * | 7/2007 | Bolms et al. | 415/116 |
| 7,553,128 B2 | 6/2009 | Abdel-Messeh et al. | |
| 7,597,533 B1 | 10/2009 | Liang | |
| 7,665,962 B1 | 2/2010 | Liang | |
| 7,704,039 B1 | 4/2010 | Liang | |
| 7,766,618 B1 | 8/2010 | Liang | |
| 7,918,642 B2 | 4/2011 | Leogrande et al. | |
| 7,988,410 B1 | 8/2011 | Liang | |
| 8,061,979 B1 | 11/2011 | Liang | |
| 8,118,547 B1 | 2/2012 | Liang | |
| 8,123,466 B2 | 2/2012 | Pietraszkiewicz et al. | |
| 8,845,272 B2 * | 9/2014 | Weber et al. | 415/115 |
| 2008/0159850 A1 | 7/2008 | Tholen et al. | |
| 2008/0211192 A1 | 9/2008 | Pietraszkiewicz et al. | |
| 2009/0169368 A1 | 7/2009 | Schlichting et al. | |
| 2010/0232929 A1 * | 9/2010 | Joe et al. | 415/1 |
| 2011/0044801 A1 | 2/2011 | DiPaola et al. | |

FOREIGN PATENT DOCUMENTS

JP    62-153504  A  *  7/1987

OTHER PUBLICATIONS

Yuya, Shrouding Segment, Jul. 8, 1987, JP62-153504A abstract.*
International Search Report and Written Opinion for PCT Application No. PCT/US2013/042969 mailed on Mar. 5, 2014.
International Preliminary Report on Patentability for PCT Application No. PCT/US2013/042969 mailed on Dec. 18, 2014.

* cited by examiner

*Primary Examiner* — Liam McDowell
(74) *Attorney, Agent, or Firm* — Carlson, Gaskey & Olds

(57) ABSTRACT

A blade outer air seal (BOAS) segment according to an exemplary embodiment of the present disclosure can include a seal body having a radially inner face and a radially outer face that circumferentially extend between a first mate face and a second mate face and axially extend between a leading edge face and a trailing edge face. At least one of the first mate face, the second mate face, the radially outer face and the radially inner face can include an inner wall having a ledge and an undercut passage radially inward from the ledge that extends uninterrupted along a length of the ledge.

22 Claims, 4 Drawing Sheets

BLADE OUTER AIR SEAL FOR A GAS TURBINE ENGINE

BACKGROUND

This disclosure relates to a gas turbine engine, and more particularly to a blade outer air seal (BOAS) that may be incorporated into a gas turbine engine.

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

The compressor and turbine sections of a gas turbine engine typically include alternating rows of rotating blades and stationary vanes. The turbine blades rotate and extract energy from the hot combustion gases that are communicated through the gas turbine engine. The turbine vanes prepare the airflow for the next set of blades.

An outer casing of an engine static structure may include one or more blade outer air seals (BOAS) that provide an outer radial flow path boundary for the hot combustion gases. A multiple of BOAS segments may be provided to accommodate thermal and dynamic variations typical in portions of the gas turbine engine, such as within the turbine section. The BOAS segments are subjected to relatively high temperatures and may be cooled with a dedicated secondary cooling airflow for temperature control.

SUMMARY

A blade outer air seal (BOAS) segment according to an exemplary embodiment of the present disclosure can include a seal body having a radially inner face and a radially outer face that circumferentially extend between a first mate face and a second mate face and axially extend between a leading edge face and a trailing edge face. At least one of the first mate face, the second mate face, the radially outer face and the radially inner face can include an inner wall having a ledge and an undercut passage radially inward from the ledge that extends uninterrupted along a length of the ledge.

In a further embodiment of the foregoing BOAS segment embodiment, the undercut passage can be in fluid communication with a core cavity of the seal body.

In a further embodiment of either of the foregoing BOAS segment embodiments, the core cavity can extend between the radially outer surface and a cover plate received against the ledge.

In a further embodiment of any of the foregoing BOAS segment embodiments, at least one cooling hole can extend through the ledge.

In a further embodiment of any of the foregoing BOAS segment embodiments, the at least one cooling hole can receive a secondary cooling airflow to impingement cool an edge portion of a core cavity of the seal body.

In a further embodiment of any of the foregoing BOAS segment embodiments, an edge portion of the undercut passage can be circumferentially offset from the inner wall in a direction away from a core cavity of the seal body.

A blade outer air seal (BOAS) assembly according to another exemplary embodiment of the present disclosure can include a BOAS segment having a radially inner face and a radially outer face that circumferentially extend between a first mate face and a second mate face and axially extend between a leading edge face and a trailing edge face. A cover plate can be received at the radially outer face such that a core cavity extends between the radially outer face and the cover plate. At least one of the first mate face and the second mate face can include a ledge that protrudes from an inner wall to support the cover plate and an undercut passage radially inward from the ledge. A core cavity can extend to an edge portion of the undercut passage that is circumferentially offset from the inner wall in a direction away from the core cavity.

In a further embodiment of the foregoing BOAS assembly embodiment, the ledge can extend from the first mate face and the edge portion is circumferentially offset from the inner wall in a direction toward the first mate face.

In a further embodiment of either of the foregoing BOAS assembly embodiments, at least one cooling hole can extend through the ledge and be positioned between the cover plate and the inner wall.

In a further embodiment of any of the foregoing BOAS assembly embodiments, the cover plate can include at least one hole.

In a further embodiment of any of the foregoing BOAS assembly embodiments, the cover plate can be metallurgically bonded to the ledge.

In a further embodiment of any of the foregoing BOAS assembly embodiments, at least one of the first mate face and the second mate face can include a plurality of holes that extend through the edge portion.

In a further embodiment of any of the foregoing BOAS assembly embodiments, the undercut passage can extend uninterrupted along a length of the edge portion.

In a further embodiment of any of the foregoing BOAS assembly embodiments, an undercut passage can extend uninterrupted between a rib and at least one of the leading edge face and the trailing edge face.

A gas turbine engine according to yet another exemplary embodiment of the present disclosure can include a compressor section, a combustor section in fluid communication with the compressor section, a turbine section in fluid communication with the combustor section, and a blade outer air seal (BOAS) assembly associated with at least one of the compressor section and the turbine section. The BOAS assembly can include a plurality of BOAS segments having a seal body that includes a radially inner face and a radially outer face that circumferentially extend between a first mate face and a second mate face and axially extend between a leading edge face and a trailing edge face. At least one of the first mate face and the second mate face can include an inner wall having a ledge and an undercut passage radially inward from the ledge. A core cavity can extend to an edge portion of the undercut passage that is circumferentially offset from the inner wall in a direction away from the core cavity.

In a further embodiment of the foregoing gas turbine engine embodiment, a cover plate can be received at the radially outer face such that the core cavity extends radially between the radially outer face and the cover plate.

In a further embodiment of either of the foregoing gas turbine engine embodiments, at least one cooling hole extends through the ledge and is positioned between the cover plate and the inner wall.

In a further embodiment of any of the foregoing gas turbine engine embodiments, the undercut passage can extend uninterrupted along a length of the ledge.

In a further embodiment of any of the foregoing gas turbine engine embodiments, a cavity is radially outward from the BOAS assembly, and a secondary cooling airflow is communicated from the cavity to the core cavity.

In a further embodiment of any of the foregoing gas turbine engine embodiments, each of the first mate face and the second mate face can include the ledge.

The various features and advantages of this disclosure will become apparent to those skilled in the art from the following detailed description. The drawings that accompany the detailed description can be briefly described as follows.

DETAILED DESCRIPTION

Figure 1:
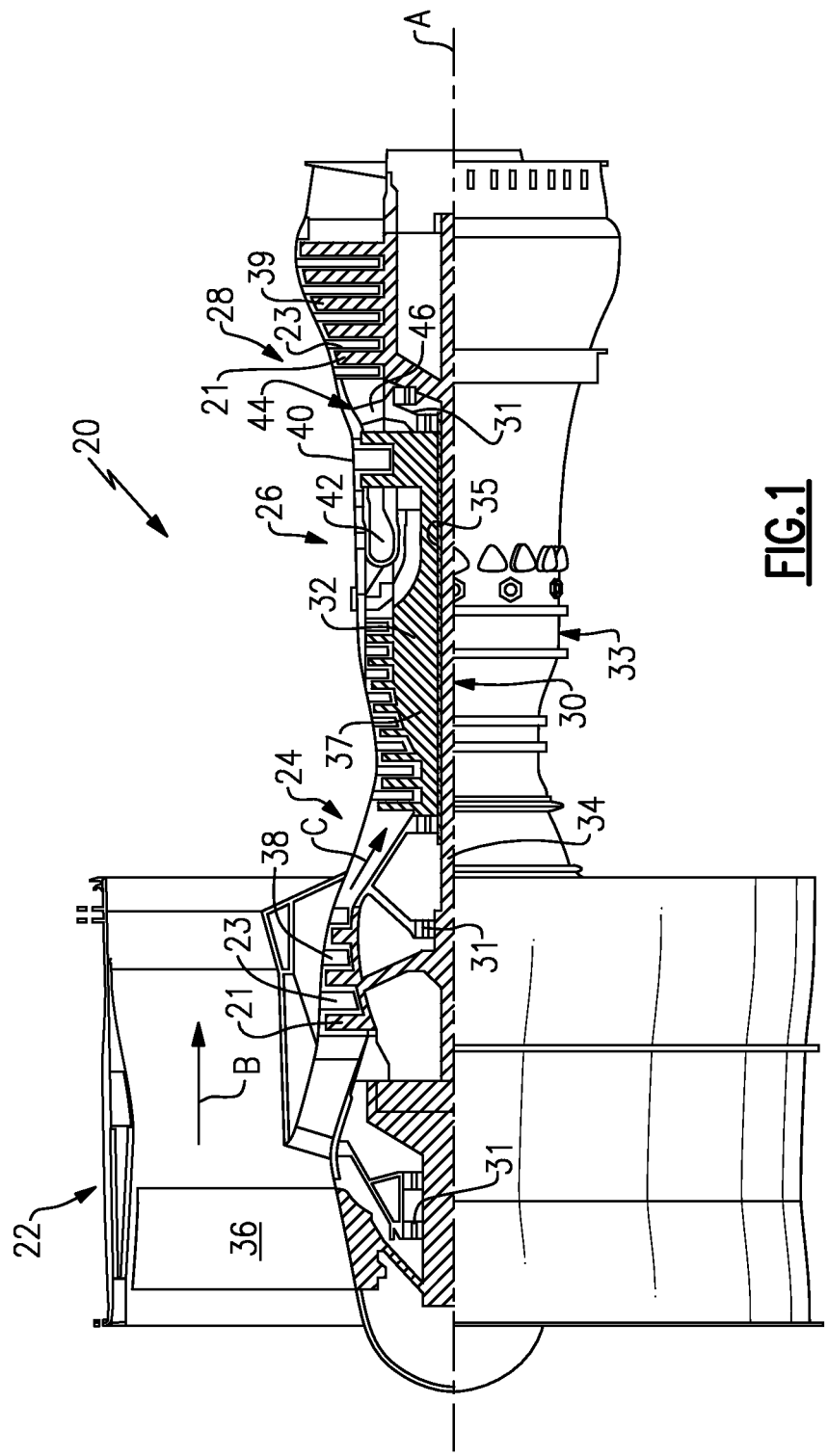
FIG. 1 illustrates a schematic, cross-sectional view of a gas turbine engine.

FIG. 1 schematically illustrates a gas turbine engine 20. The exemplary gas turbine engine 20 is a two-spool turbofan engine that generally incorporates a fan section 22, a compressor section 24, a combustor section 26 and a turbine section 28. Alternative engines might include an augmenter section (not shown) among other systems for features. The fan section 22 drives air along a bypass flow path B, while the compressor section 24 drives air along a core flow path C for compression and communication into the combustor section 26. The hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of engines, including but not limited to, three-spool engine architectures.

The gas turbine engine 20 generally includes a low speed spool 30 and a high speed spool 32 mounted for rotation about an engine centerline longitudinal axis A. The low speed spool 30 and the high speed spool 32 may be mounted relative to an engine static structure 33 via several bearing systems 31. It should be understood that various bearing systems 31 at various locations may alternatively or additionally be provided.

The low speed spool 30 generally includes an inner shaft 34 that interconnects a fan 36, a low pressure compressor 38 and a low pressure turbine 39. The high speed spool 32 includes an outer shaft 35 that interconnects a high pressure compressor 37 and a high pressure turbine 40. In this embodiment, the inner shaft 34 and the outer shaft 35 are supported at various axial locations by bearing systems 31 positioned within the engine static structure 33.

A combustor 42 is arranged between the high pressure compressor 37 and the high pressure turbine 40. A mid-turbine frame 44 may be arranged generally between the high pressure turbine 40 and the low pressure turbine 39. The mid-turbine frame 44 supports one or more bearing systems 31 of the turbine section 28. The mid-turbine frame 44 may include one or more airfoils 46 that may be positioned within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low pressure compressor 38 and the high pressure compressor 37, is mixed with fuel and burned in the combustor 42, and is then expanded over the high pressure turbine 40 and the low pressure turbine 39. The high pressure turbine 40 and the low pressure turbine 39 rotationally drive the respective low speed spool 30 and the high speed spool 32 in response to the expansion. The compressor section 24 and the turbine section 28 can each include alternating rows of rotor assemblies and vane assemblies. The rotor assemblies carry a plurality of rotating blades 21, while each vane assembly includes a plurality of vanes 23.

Figure 2:
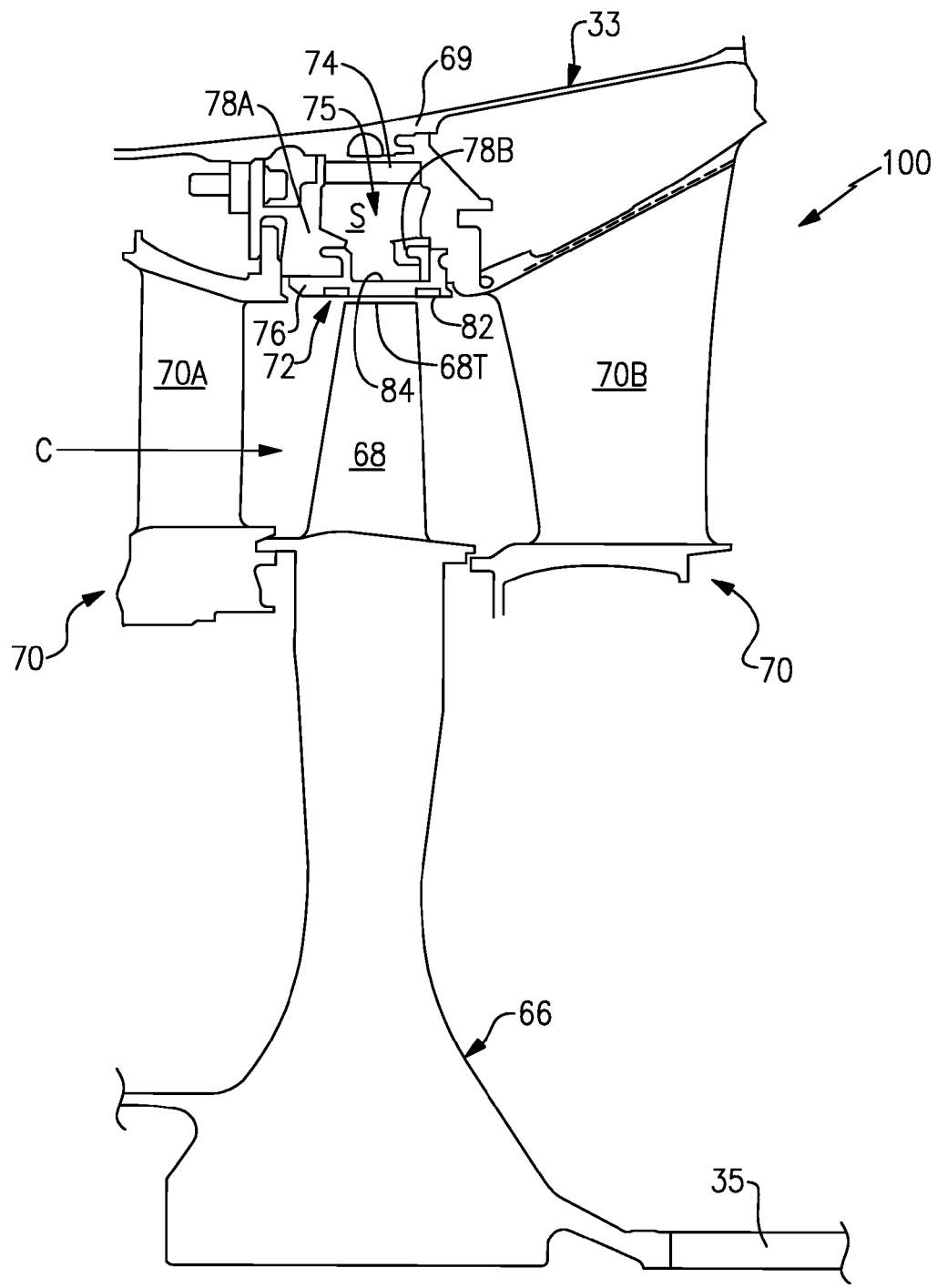
FIG. 2 illustrates a cross-section of a portion of a gas turbine engine.

FIG. 2 illustrates a portion 100 of a gas turbine engine, such as the gas turbine engine 20 of FIG. 1. In this exemplary embodiment, the portion 100 represents the high pressure turbine 40. However, it should be understood that other portions of the gas turbine engine 20 could benefit from the teachings of this disclosure, including but not limited to, the compressor section 24 and the low pressure turbine 39.

In this exemplary embodiment, a rotor disk 66 (only one shown, although multiple disks could be axially disposed within the portion 100) is mounted to the outer shaft 35 and rotates as a unit with respect to the engine static structure 33. The portion 100 includes alternating rows of rotating blades 68 (mounted to the rotor disk 66) and vanes 70A and 70B of vane assemblies 70 that are also supported within an outer casing 69 of the engine static structure 33.

Each blade 68 of the rotor disk 66 includes a blade tip 68T that is positioned at a radially outermost portion of the blades 68. The blade tip 68T extends toward a blade outer air seal (BOAS) assembly 72. The BOAS assembly 72 may find beneficial use in many industries including aerospace, industrial, electricity generation, naval propulsion, pumps for gas and oil transmission, aircraft propulsion, vehicle engines and stationery power plants.

The BOAS assembly 72 is disposed in an annulus radially between the outer casing 69 and the blade tip 68T. The BOAS assembly 72 generally includes a support structure 74 and a multitude of BOAS segments 76 (only one shown in FIG. 2). The BOAS segments 76 may form a full ring hoop assembly that encircles associated blades 68 of a stage of the portion 100. The support structure 74 is mounted radially inward from the outer casing 69 and includes forward and aft flanges 78A, 78B that mountably receive the BOAS segments 76. The forward flange 78A and the aft flange 78B may be manufactured of a metallic alloy material and may be circumferentially segmented for the receipt of the BOAS segments 76.

The support structure 74 may establish a cavity 75 that extends axially between the forward flange 78A and the aft flange 78B and radially between the outer casing 69 and the BOAS segment 76. A secondary cooling airflow S may be communicated into the cavity 75 to provide a dedicated source of cooling airflow for cooling the BOAS segments 76. The secondary cooling airflow S can be sourced from the high pressure compressor 37 or any other upstream portion of the gas turbine engine 20.

Figure 3:
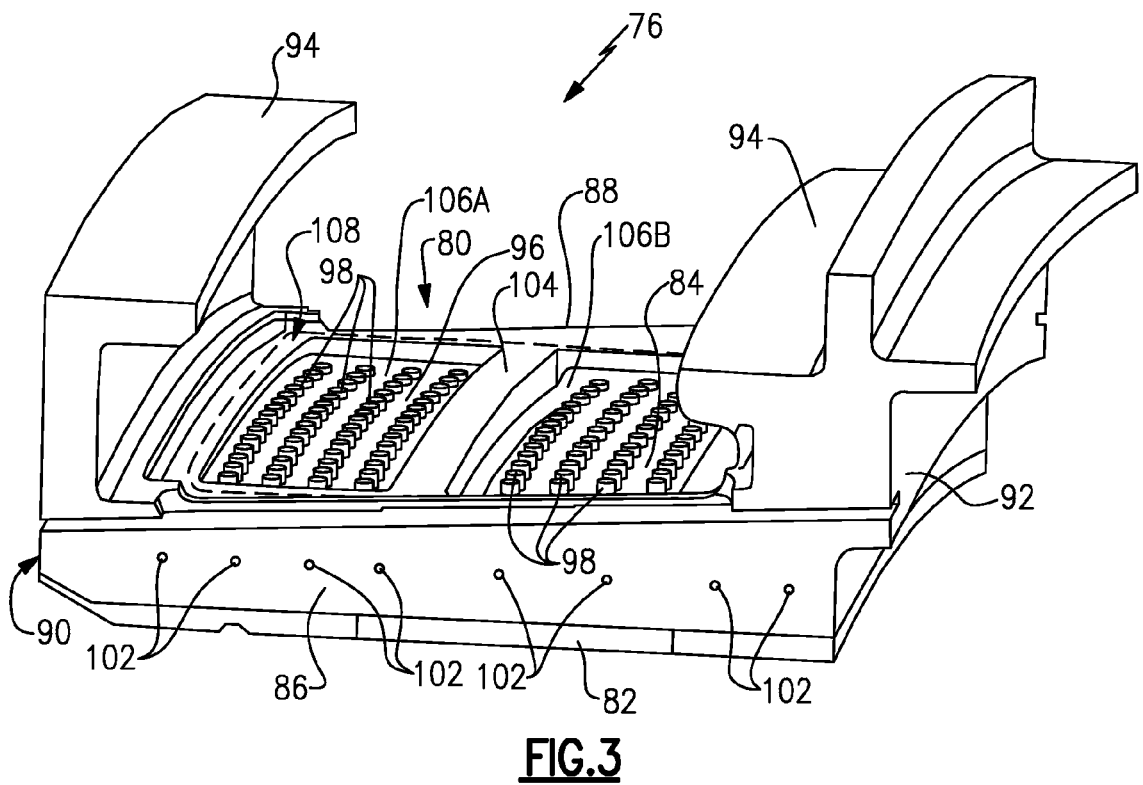
FIG. 3 illustrates a perspective view of a blade outer air seal (BOAS) segment.

FIG. 3 illustrates one exemplary embodiment of a BOAS segment 76 that may be incorporated into a gas turbine engine, such as the gas turbine engine 20. The BOAS segment 76 may include a seal body 80 having a radially inner face 82 that faces toward the blade tip 68T and a radially outer face 84 that faces toward the cavity 75 (See FIG. 2). The radially inner face 82 and the radially outer face 84 circumferentially extend between a first mate face 86 and a second mate face 88 and axially extend between a leading edge face 90 and a trailing edge face 92. The seal body 80 may include a unitary structure (i.e., a monolithic piece) manufactured of a nickel based super alloy or any other suitable material.

The leading edge face 90 and the trailing edge face 92 may include attachment features 94 to engage the forward and aft flanges 78A, 78B to secure each BOAS segment 76 to the support structure 74 (FIG. 2). That is, the leading edge face 90 and trailing edge face 92 engage the forward and aft flanges 78A, 78B to establish a metal alloy-to-metal alloy static structure interface. The first and second mate faces 86, 88 of the seal body 80 face similar faces of adjacent BOAS segments 76 to provide the BOAS assembly 72 in the form of a full ring hoop assembly. The engagement features 94 may include hooks to connect to the support structure 74. It should be understood that various interfaces and attachment features may alternatively or additionally be provided.

Each BOAS segment 76 may include a core cavity 96 positioned on the same side of the seal body as the radially outer face 84. The core cavity 96 may receive the secondary cooling airflow S to impingement cool the BOAS segment 76. In this exemplary embodiment, a plurality of augmentation features 98 protrude in a radially outward direction from the radially outer face 84 of the seal body 80. The augmentation features 98 may increase the heat transfer between the secondary cooling airflow S that is communicated through the core cavity 96 and the seal body 80 of the BOAS segment 76.

The first mate face 86 and the second mate face 88 may also include a plurality of holes 102 that communicate the secondary cooling airflow S into the core flow path C (FIG. 2) after the secondary cooling airflow S has been circulated through the core cavity 96. It should be understood that various other holes, such as edge holes, film holes, impingement holes and the like, including any number, size, orientation or arrangement of such holes, may be provided on the BOAS segment 76.

The core cavity 96 may also include one or more ribs 104 that partition the core cavity 96 into multiple compartments 106. In this exemplary embodiment, the rib 104 partitions the core cavity 96 into at least two compartments 106A, 106B. However, additional ribs and compartments may be incorporated into the BOAS segment 76.

A cover plate 108 may be received at the radially outer face 84 of the BOAS segment 76 such that the core cavity 96 extends between the radially outer face 84 and the cover plate 108. The cover plate 108 may include multiple holes 110 (shown in FIGS. 5-6) for directing the secondary cooling airflow into the core cavity 96 from the cavity 75 (See FIG. 2) to impingement cool the seal body 80. In this exemplary embodiment, the cover plate 108 is shown in phantom to demonstrate the core cavity 96.

Figure 4:
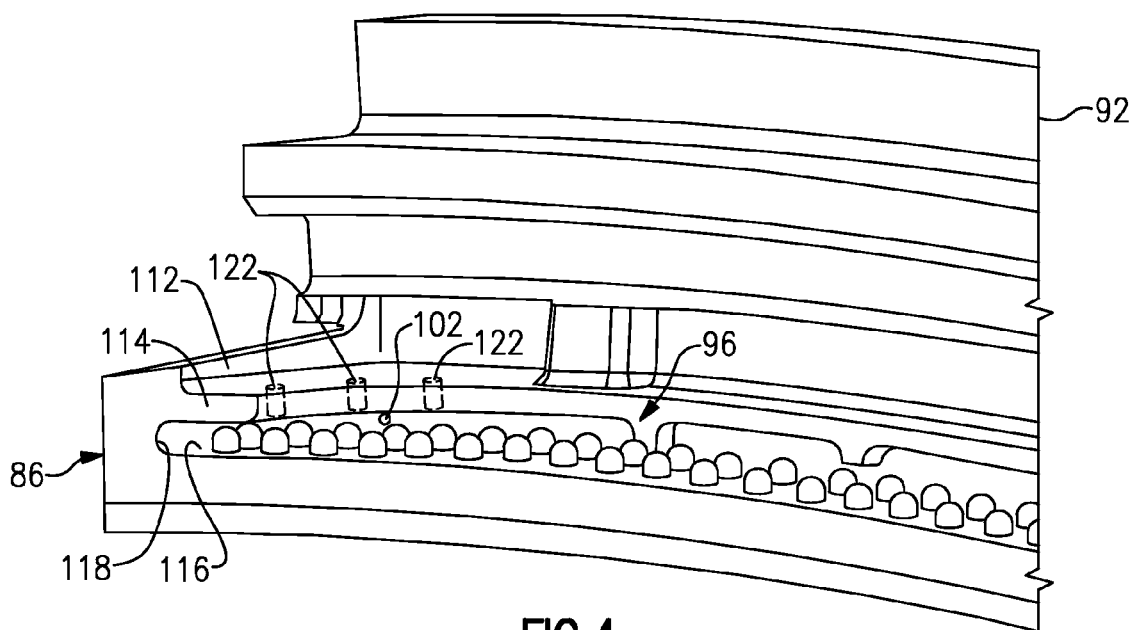
FIG. 4 illustrates a cross-sectional view of a BOAS segment.

Referring to FIG. 4, the mate face 86 may include an inner wall 112. Although this embodiment is shown and described with respect to the first mate face 86, it should be understood that FIG. 4 could be representative of the first mate face 86, the second mate face 88, the leading edge face 90 or the trailing edge face 92.

In one exemplary embodiment, a ledge 114 extends from the inner wall 112 in a direction toward the opposite mate face (the mate face 88 in this embodiment). An undercut passage 116 extends radially inwardly from the ledge 114. An edge portion 118 of the core cavity 96 extends along a length of the mate face 86. In this manner, the undercut passage 116 is in fluid communication with the core cavity 96 and extends the core cavity 96 closer toward the first mate face 86 to actively cool this location of the BOAS segment 76. The undercut passage 116 may extend uninterrupted along the length of the ledge 114 (and along the length of the edge portion 118). In another exemplary embodiment, the undercut passage 116 extends uninterrupted between the rib 104 and each of the leading edge face 90 and the trailing edge face 92 (See FIG. 3).

Figure 5:
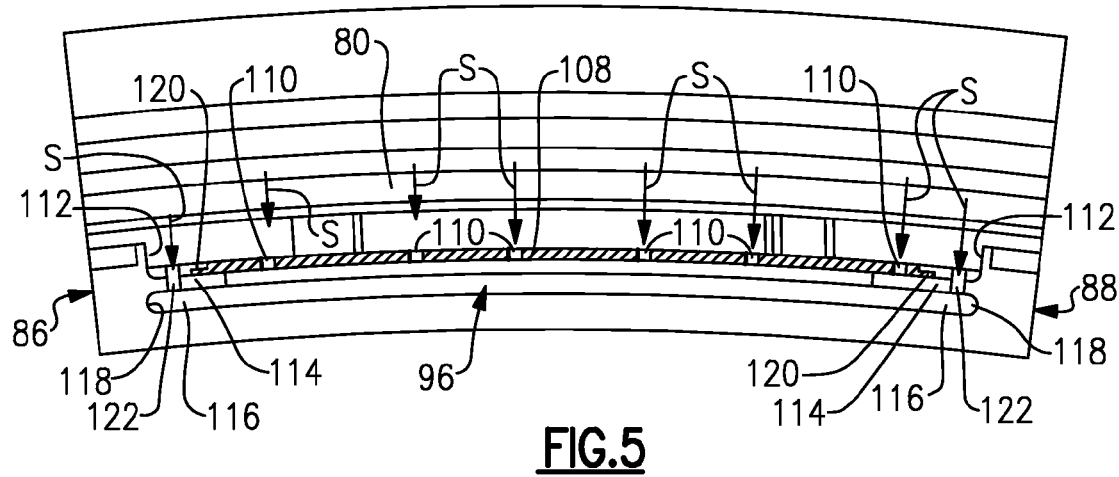
FIG. 5 illustrates a front, cross-sectional view of a BOAS segment.

FIG. 5 illustrates another cross-sectional view of a BOAS segment 76 viewed from forward to aft (i.e., in a direction from the leading edge face 90 toward the trailing edge face 92). The ledges 114 establish a support shelf that the cover plate 108 can rest against along the inner walls 112 of the first mate face 86 and the second mate face 88. Similar ledges could also extend along the leading edge face 90 and the trailing edge face 92.

The cover plate 108 may include metallurgically bonded portions 120 at its opposite ends for securing the cover plate 108 to the seal body 80. One or more cooling holes 122 may be drilled through the ledges 114 between the metallurgically bonded portions 120 of the cover plate 108 and the inner walls 112. The cooling holes 122 may communicate the secondary cooling airflow S directly from the cavity 75 into the undercut passages 116 to actively impingement cool the edge portions 118 of the core cavity 96. In one exemplary embodiment, a plurality of cooling holes 122 are disposed in a spaced relationship along an entire length of the ledges 114 (See FIG. 4).

Figure 6:
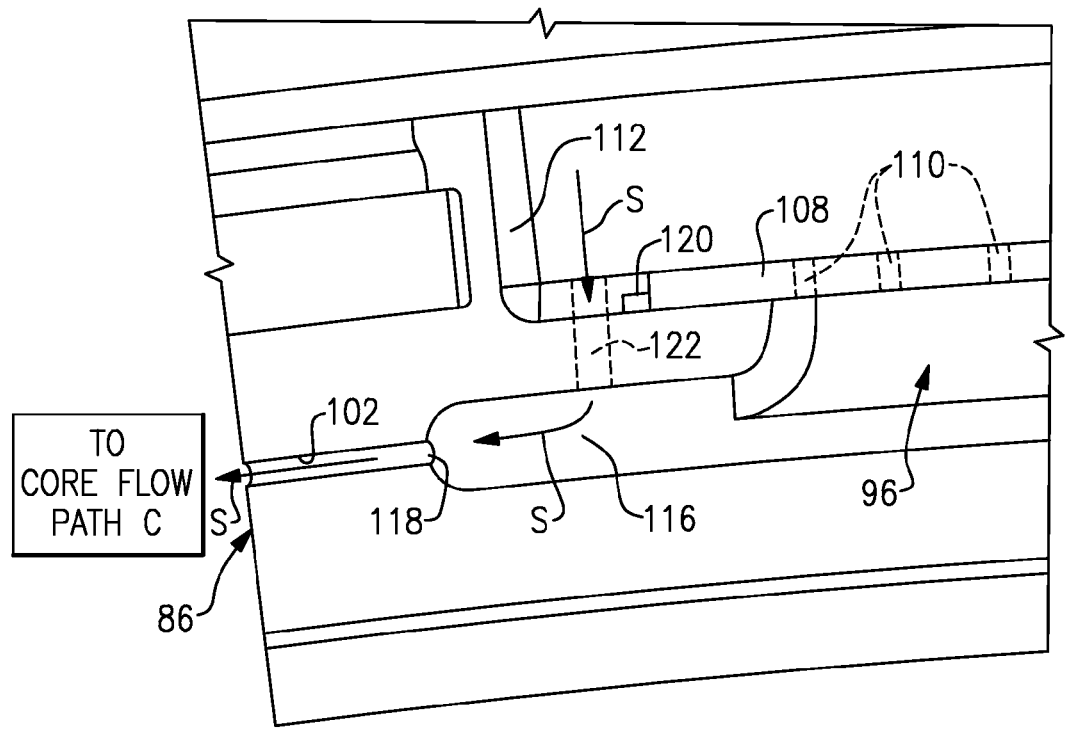
FIG. 6 illustrates yet another view of a BOAS segment.

Referring to FIG. 6, the undercut passage 116 extends to an edge portion 118. The edge portion 118 of the undercut passage 116 may be circumferentially offset from the inner wall 112 in a direction toward the first mate face 86. In this embodiment, the circumferential offset extends from the left toward the right of the page. In other words, the circumferential offset extends in a direction away from the core cavity 96. The holes 102 of the mate face 86 extend through the edge portion 118 such that the secondary cooling airflow S can be exhausted from the core cavity 96 into the core flow path C.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would recognize that various modifications could come within the scope of this disclosure. For these reasons, the following claims should be studied to determine the true scope and content of this disclosure.

What is claimed is:

1. A blade outer air seal (BOAS) segment, comprising:
a seal body having a radially inner face and a radially outer face that circumferentially extend between a first mate face and a second mate face and axially extend between a leading edge face and a trailing edge face; and
at least one of said first mate face and said second mate face including an inner wall having a ledge that protrudes from said inner wall and an undercut passage radially inward from said ledge and that extends uninterrupted along a length of said ledge, said ledge further extending along an inner wall of at least one of said leading edge face and said trailing edge face.

2. The BOAS segment as recited in claim 1, wherein said undercut passage is in fluid communication with a core cavity of said seal body.

3. The BOAS segment as recited in claim 2, wherein said core cavity extends between said radially outer surface and a cover plate received against said ledge.

4. The BOAS segment as recited in claim 1, comprising at least one cooling hole that extends through said ledge.

5. The BOAS segment as recited in claim 4, wherein said at least one cooling hole receives a secondary cooling airflow to impingement cool an edge portion of a core cavity of said seal body.

6. The BOAS segment as recited in claim 1, wherein an edge portion of said undercut passage is circumferentially offset from said inner wall in a direction away from a core cavity of said seal body.

7. The BOAS segment as recited in claim 1, comprising:
a cooling hole formed through said ledge and opening into said undercut passage; and
a hole extending between an edge portion of said undercut passage and an exterior wall of said at least one of said first mate face and said second mate face that includes said ledge, wherein a secondary cooling airflow path extends through said cooling hole, into said undercut passage, and then through said hole.

8. A blade outer air seal (BOAS) assembly, comprising:
a BOAS segment having a radially inner face and a radially outer face that circumferentially extend between a first mate face and a second mate face and axially extend between a leading edge face and a trailing edge face;
a cover plate received at said radially outer face such that a core cavity extends between said radially outer face and said cover plate;
wherein at least one of said first mate face and said second mate face include a ledge that protrudes from an inner wall to support said cover plate and an undercut passage radially inward from said ledge, wherein said core cavity extends to an edge portion of said undercut passage that is circumferentially offset from said inner wall in a direction away from said core cavity;
a cooling hole formed through said ledge and opening into said undercut passage; and
a hole extending between said edge portion and an exterior wall of said at least one of said first mate face and said second mate face that includes said ledge, wherein a secondary cooling airflow path extends through said cooling hole, into said undercut passage, and then through said hole.

9. The BOAS assembly as recited in claim 8, wherein said ledge extends from said first mate face and said edge portion is circumferentially offset from said inner wall in a direction toward said first mate face.

10. The BOAS assembly as recited in claim 8, wherein said cooling hole is positioned between said cover plate and said inner wall.

11. The BOAS assembly as recited in claim 8, wherein said cover plate includes at least one hole.

12. The BOAS assembly as recited in claim 8, wherein said cover plate is metallurgically bonded to said ledge.

13. The BOAS assembly as recited in claim 8, wherein at least one of said first mate face and said second mate face includes a plurality of holes that extend through said edge portion.

14. The BOAS assembly as recited in claim 13, wherein said undercut passage extends uninterrupted along a length of said edge portion.

15. The BOAS assembly as recited in claim 8, wherein said undercut passage extends uninterrupted between a rib and at least one of said leading edge face and said trailing edge face.

16. The BOAS assembly as recited in claim 8, wherein said ledge extends along an inner wall of at least one of said leading edge face and said trailing edge face.

17. A gas turbine engine, comprising:
a compressor section;
a combustor section in fluid communication with said compressor section;
a turbine section in fluid communication with said combustor section;
a blade outer air seal (BOAS) assembly associated with at least one of said compressor section and said turbine section, wherein said BOAS assembly includes a plurality of BOAS segments having:
a seal body having a radially inner face and a radially outer face that circumferentially extend between a first mate face and a second mate face and axially extend between a leading edge face and a trailing edge face; and
wherein at least one of said first mate face and said second mate face include an inner wall having a ledge that protrudes from said inner wall and an undercut passage radially inward from said ledge, said ledge further extending along an inner wall of at least one of said leading edge face and said trailing edge face, wherein a core cavity extends to an edge portion of said undercut passage that is circumferentially offset from said inner wall in a direction away from said core cavity.

18. The gas turbine engine as recited in claim 17, comprising a cover plate received at said radially outer face such that said core cavity extends radially between said radially outer face and said cover plate.

19. The gas turbine engine as recited in claim 18, comprising at least one cooling hole through said ledge and positioned between said cover plate and said inner wall.

20. The gas turbine engine as recited in claim 17, wherein said undercut passage extends uninterrupted along a length of said ledge.

21. The gas turbine engine as recited in claim 17, comprising a cavity radially outward from said BOAS assembly, wherein a secondary cooling airflow is communicated from said cavity to said core cavity.

22. The gas turbine engine as recited in claim 17, wherein each of said first mate face and said second mate face include said ledge.

\* \* \* \* \*